US006104027A

United States Patent [19]

Gee et al.

[11] Patent Number: 6,104,027

[45] Date of Patent: Aug. 15, 2000

[54] DECONVOLUTION OF MULTIPLY CHARGED IONS

[75] Inventors: Nora W. Gee, Los Altos; Steven M. Fischer, Hayward; Christine A. Miller, Campbell, all of Calif.

[73] Assignee: Hewlett-Packard Company, Palo Alto, Calif.

[21] Appl. No.: 09/092,258

[22] Filed: Jun. 5, 1998

[51] Int. Cl.[7] .............................. H01J 49/00; B01D 59/44

[52] U.S. Cl. .............................................. 250/282; 250/281

[58] Field of Search ..................................... 250/281, 282; 382/260, 280, 181

[56] References Cited

U.S. PATENT DOCUMENTS 5,072,115 12/1991 Zhou ........................................ 250/281
5,130,538 7/1992 Fenn et al. ................................ 250/282
5,440,119 8/1995 Labowsky ................................. 250/282
5,916,747 6/1999 Gilchrist et al. ............................ 435/6

OTHER PUBLICATIONS

Kundur, et al., "Blind Image Deconvolution," IEEE Signal Processing Magazine, vol.: 13(3), pp. 43–64, May 1996.

*Primary Examiner*—Seungsook Ham
*Assistant Examiner*—John Patti
*Attorney, Agent, or Firm*—Robert T. Martin

[57] ABSTRACT

Method for identifying low charge, low weight ions with multiple charge states in mass spectrographic analysis. Ions are matched to a charge series by testing peak width, isotope spacing, and isotope ratios, using instrument resolution and information derived from the instrument spectrum. By following these tests erroneous assignment of ions to a series are avoided, providing higher quality data to the user.

8 Claims, 10 Drawing Sheets

ISOTOPE DISTRIBUTION (C40 H73 N11 012), CHARGE=1

ISOTOPE DISTRIBUTION (C40 H73 N11 O12), CHARGE=1

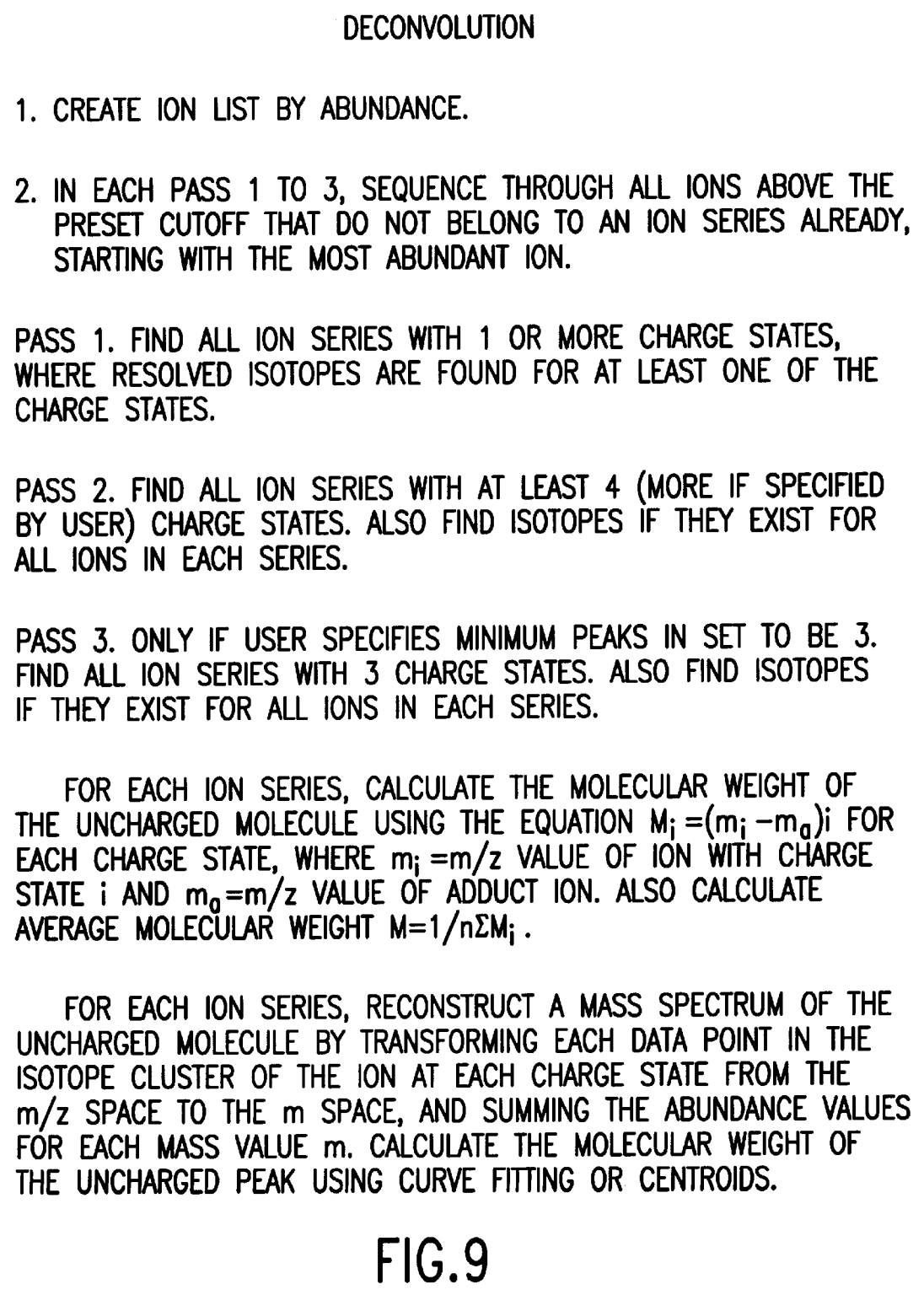

DECONVOLUTION

1. CREATE ION LIST BY ABUNDANCE.

2. IN EACH PASS 1 TO 3, SEQUENCE THROUGH ALL IONS ABOVE THE PRESET CUTOFF THAT DO NOT BELONG TO AN ION SERIES ALREADY, STARTING WITH THE MOST ABUNDANT ION.

PASS 1. FIND ALL ION SERIES WITH 1 OR MORE CHARGE STATES, WHERE RESOLVED ISOTOPES ARE FOUND FOR AT LEAST ONE OF THE CHARGE STATES.

PASS 2. FIND ALL ION SERIES WITH AT LEAST 4 (MORE IF SPECIFIED BY USER) CHARGE STATES. ALSO FIND ISOTOPES IF THEY EXIST FOR ALL IONS IN EACH SERIES.

PASS 3. ONLY IF USER SPECIFIES MINIMUM PEAKS IN SET TO BE 3. FIND ALL ION SERIES WITH 3 CHARGE STATES. ALSO FIND ISOTOPES IF THEY EXIST FOR ALL IONS IN EACH SERIES.

FOR EACH ION SERIES, CALCULATE THE MOLECULAR WEIGHT OF THE UNCHARGED MOLECULE USING THE EQUATION $M_i=(m_i-m_a)i$ FOR EACH CHARGE STATE, WHERE $m_i=m/z$ VALUE OF ION WITH CHARGE STATE $i$ AND $m_a=m/z$ VALUE OF ADDUCT ION. ALSO CALCULATE AVERAGE MOLECULAR WEIGHT $M=1/n\Sigma M_i$.

FOR EACH ION SERIES, RECONSTRUCT A MASS SPECTRUM OF THE UNCHARGED MOLECULE BY TRANSFORMING EACH DATA POINT IN THE ISOTOPE CLUSTER OF THE ION AT EACH CHARGE STATE FROM THE m/z SPACE TO THE m SPACE, AND SUMMING THE ABUNDANCE VALUES FOR EACH MASS VALUE m. CALCULATE THE MOLECULAR WEIGHT OF THE UNCHARGED PEAK USING CURVE FITTING OR CENTROIDS.

FIG.9

FIND ISOTOPES (1) ISOTOPE SPACING=1/CHARGE (2) IS ION PEAK WIDTH AT HALF HEIGHT OF INSTRUMENT<=0.8 TIMES ISOTOPE SPACING? IF YES, GO FIND RESOLVED ISOTOPES (3) IF NOT, IS ION PEAK WIDTH AT HALF HEIGHT OF INSTRUMENT<=2 TIMES ISOTOPE SPACING? IF YES, FIND UNRESOLVED ISOTOPES (4) IF NOT, DON'T LOOK FOR ISOTOPES.

FIG.10

FIND RESOLVED ISOTOPES (1) CHECK SPECTRAL PEAK WIDTH OF ION, IF TOO WIDE, DONE.

(2) CALCULATE ISOTOPE SPACING, CALCULATE ALLOWABLE RANGE OF SPACING, TAKING INTO ACCOUNT SPECTRAL STEP SIZE AND EXPECTED SPACING (3) CHECK NEAREST ION AT LOWER m/z. IF SPACING TOO SMALL, DONE.

(4) IF OK, CHECK NEXT ION TO THE RIGHT (5) IF THE SPACING IS OK, CHECK ISOTOPE RATIO. IF RATIO IS OK, LOOP BACK TO (4)

(6) IF SPACING OR RATIO IS INCONSISTENT, DO WE EXPECT ISOTOPES AT A LOWER m/z?

(7) IF YES, CHECK NEAREST ION AT A LOWER m/z.

(8) IF SPACING IS OK, CHECK ISOTOPE RATIO (9) IF ISOTOPE RATIO IS OK, LOOP TO (7)

(10) IF NO ISOTOPES EXPECTED AT LOWER m/z, OR RATIO INCONSISTENT, DID WE FIND ANY ISOTOPES?

(11) IF YES, COMPUTE CENTROID OF ALL ISOTOPES AND RETURN NUMBER FOUND

(12) DONE.

FIG. 11

FIND UNRESOLVED ISOTOPES (1) CALCULATE ISOTOPE SPACING (2) CALCULATE ALLOWABLE RANGE OF SPACING BASED ON SPECTRAL PEAK WIDTH OF ION AND SPECTRAL STEP SIZE (3) CHECK NEAREST ION AT HIGHER m/z (4) IF SPACING IS OK, CHECK ISOTOPE RATIO. IF OK, LOOP TO (3)

(5) IF SPACING IS INCONSISTENT, DO WE EXPECT ISOTOPES AT A LOWER m/z GIVEN THE MASS (6) IF YES, CALCULATE ALLOWABLE RANGE OF SPACING BASED ON SPECTRAL PEAK WIDTH OF ION AND SPECTRAL STEP SIZE (7) CHECK NEAREST ION AT LOWER m/z (8) IF SPACING AND ISOTOPE RATIO ARE OK, LOOP TO (6)

(9) IF NO ISOTOPES EXPECTED AT LOWER m/z, OR SPACING OR RATIO ARE INCONSISTENT, WERE ANY ISOTOPES FOUND?

(10) IF YES, COMPUTE CENTROID OF ALL ISOTOPES AND RETURN NUMBER OF ISOTOPES FOUND

(11) DONE

FIG. 12

DECONVOLUTION OF MULTIPLY CHARGED IONS

BACKGROUND OF THE INVENTION

1. Field of the Invention

The present invention applies to the art of mass spectrometry, and in particular to interpreting mass spectra with multiply charged ions in the presence of noise, mixtures and contaminants, especially for low charge, low molecular weight analytes such as peptides.

2. Art Background

The mass spectrometer produces information on mass-to-charge ratios, often shown as m/z, of analytes in a sample. This information must be interpreted to assign molecular weights to the analyte, the sample being analyzed. The process used in electrospray ionization produces ions with multiple charge states, that is, ions at different m/z values where the mass m is the same for each ion, but the charge z is different. Interpreting these spectra with multiply charged ions involves the process of deconvoluting the ions to obtain a molecular weight assignment of the uncharged analyte. In the real world, this process must be accomplished in the presence of instrument noise, contaminants, mixtures, and artifacts.

For high molecular weight analytes, the analysis is relatively simple: 1) an ion is chosen, 2) an arbitrary charge state is assigned to the ion, 3) surrounding ions are tested to see if a charge series exists, and 4) the process is repeated until all related ions in the series are found. This process works reasonably well for high molecular weight (>8000 Daltons) analytes because 1) at high molecular weights the isotope distribution becomes Gaussian, 2) the series test can require many charge states to succeed since many charge states will always be present, and 3) most mass analyzers do not have the resolving power to separate the isotopes of a highly charged ion. An approach similar to this is described in U.S. Pat. No. 5,130,538 to Fenn, et. al.

In comparison, deconvoluting low charge, low molecular weight analytes such as peptides is more problematic: 1) often only one or two charge states exist, thus making series testing more difficult or impossible to perform, 2) isotope patterns do not follow a Gaussian distribution for low molecular weights, and 3) isotopes can be resolved for low charge states.

The process disclosed by Fenn cannot correctly interpret these low charge, low molecular weight analytes. The comparatively large number of charge states required by Fenn are not present, and extending the process disclosed in Fenn to work with a low number of charge states often results in errors of assignment. Because only one or two charge states are present, extending Fenn leads to erroneous associations between "noise" ions and signal ions, producing erroneous and misleading results.

What is needed is a way to deal with multiply charged spectra of low charge, low molecular weight analytes in performing molecular weight assignment.

SUMMARY OF THE INVENTION

Spectra are deconvolved relying on the instrument resolution and additional information contained in and derived from the mass spectrum reported by the instrument. If possible, ions with low charge states are assigned their charge state prior to deconvolution by examining isotope spacing and verifying that spacing is possible considering the instrument resolution and the proposed charge state. Ion peak width is examined to insure it is consistent with the instrument resolution. Ion peak width testing is used to verify if an ion truly belongs to a charge series. If isotopes are unresolved, ion peak width decreases smoothly as the charge state goes from low to high, becoming asymptotic to the instrument peak width. The ratio of adjacent isotopes is examined to make sure it is consistent with the proposed mass and the likely elemental composition of a bio-polymer.

If a charge state is assigned to an ion, the process then looks for a corresponding ion at plus and minus one charge unit. This process is repeated until an ion series is exhausted. These ions, and their isotopes, are then removed from the pool of ions to be used to start a new series. This process is repeated on the pool of remaining ions until all ions are examined.

Deconvolution requiring at least 3 charge states is then performed on the remaining unassigned ions. Additional tests are employed during the deconvolution process. If an ion is assigned a charge state that could possibly be distinguished by the isotope spacing, width, or ratio test, those tests are applied to verify or reject the charge assignment.

By only marking those ions that pass all the tests, fewer charge assignment errors are made. Molecular weight can be assigned to samples having only one charge state. Monomer/dimer pairs can be distinguished from +1 and +2 pairs.

BRIEF DESCRIPTION OF THE DRAWINGS

The present invention is described with respect particular exemplary embodiments thereof and reference is made to the drawings in which:

FIG. 9 shows a flow diagram of the deconvolution process, FIG. 10 shows a flow diagram of the find isotope process, FIG. 11 shows a flow diagram of the find resolved isotope process, and FIG. 12 shows a diagram of the find unresolved isotope process.

DETAILED DESCRIPTION

Figure 1:
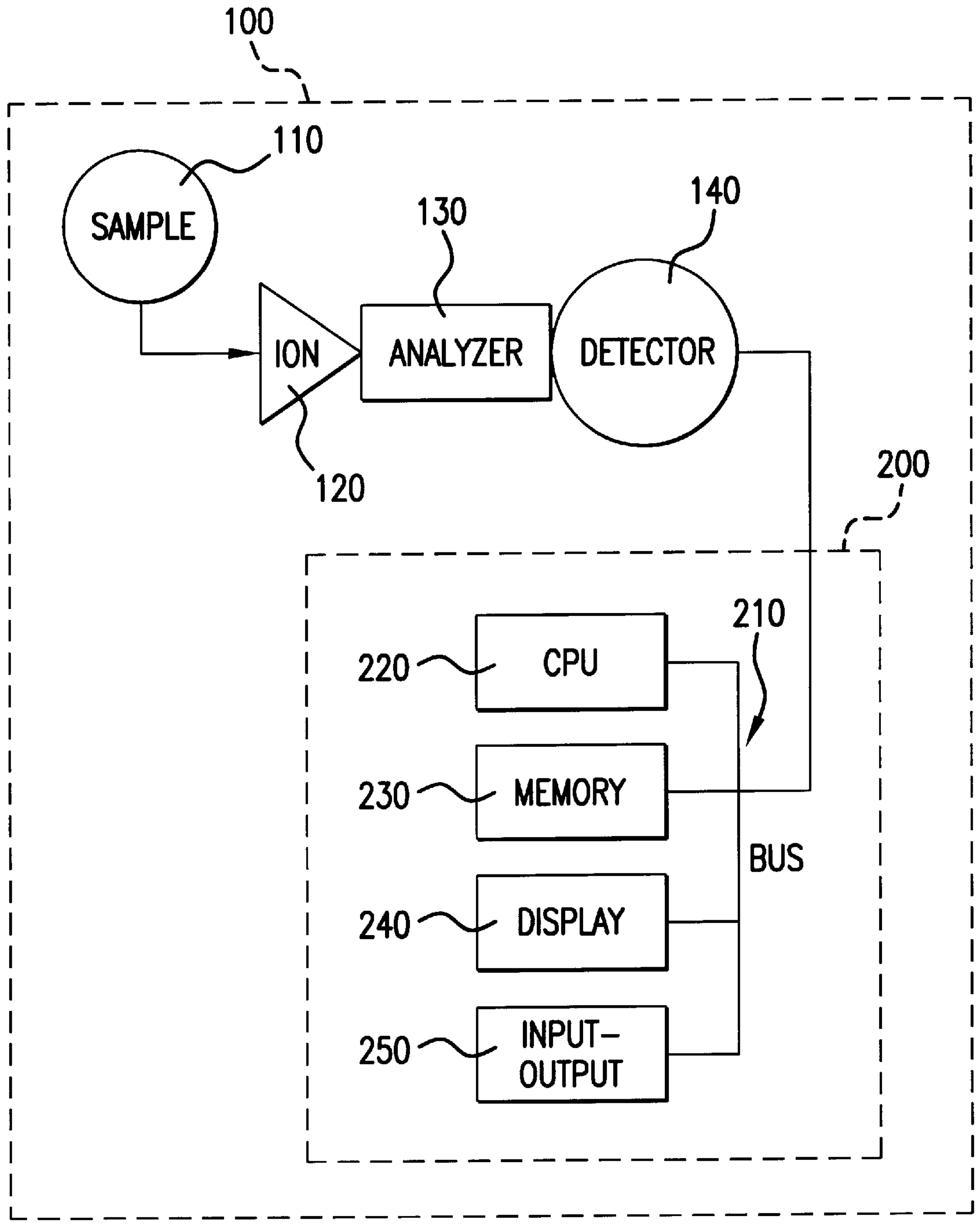
FIG. 1 is a block diagram of a mass spectrometry system.

FIG. 1 shows a simplified mass spectrometry system 100 in block diagram form. Components such as vacuum subsystems, power supplies, and the like are not shown. In operation, sample 110 is introduced into ionizer 120, producing a group of ions. These ions are fed into analyzer 130, and then to detector 140. Analyzer 130 may be a device such as a quadrupole analyzer, a time-of-flight analyzer, an ion cyclotron resonance device, or other mass analyzer as is known in the art. Detector 140 is typically some form of electron multiplier connected to an analog to digital converter (ADC) to make its output suitable for use in digital data processing. Techniques such as oversampling and low pass filtering may be used in detector 140 to reduce noise. The output of the mass spectrograph detector 140 is a time series of m/z values and abundance values. The task of the analysis portion 200 of the instrument is to take this detector data, extract peak data and assign that data to ions, and match the ions to isotope and charge series, finally producing molecular weights for the uncharged analytes in the sample. This analysis may be performed on the data from a single spectrum, or the data from a number of spectra may be combined. Using the data from a number of spectra has the advantage of possibly averaging out errors, while introducing the difficulty of broadening or smearing detail.

The data analysis portion 200 comprises a digital computer system in which central bus 210 connects central processing unit (CPU) 220 with memory subsystem 230, display 240, and additional input/output devices 250. While FIG. 1 shows the analysis portion 200 of the instrument as part of the overall mass spectrometry system 100, the analysis portion may be a separate stand alone unit, connected to detector 140 through input/output interfaces known to the art.

Figure 2:
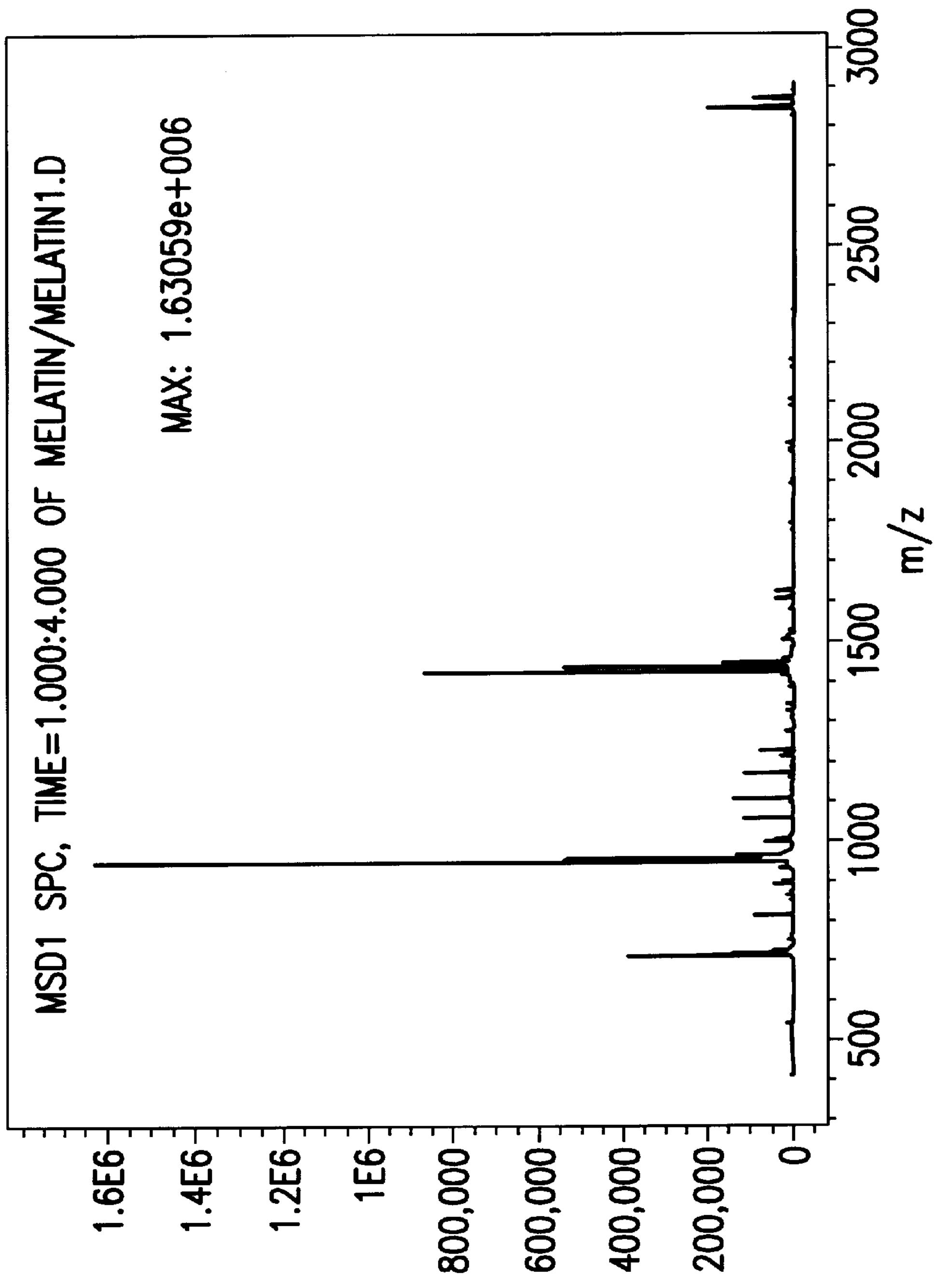
FIG. 2 shows the typical output of the detector.

The instrument deals with the abundance of ion samples in the m/z space. FIG. 2 shows the typical output of detector 140, with the x axis representing m/z, and the y axis abundance. Operating in the m/z space has the practical effect of folding the higher charge state members of a species of ions to lower values in the m/z space. For example, a particular molecule of mass 840 Daltons will have its singly charged species at m/z=841, the +2 charged species at m/z=842/2=421, and the +3 charged species, if present, at m/z=843/3=281. An instrument with high resolving power would be able to resolve the isotope cluster of each ion at any charge state. At the +1 charge state, isotopes are separated 1 atomic mass units (amu) apart. At the +2 charge state, because the instrument deals with m/z measurements, isotopes are ½ amu apart in m/z space. For +3 charge states, isotope spacing is ⅓ amu, and so on. This is important as the finite resolving power of the instrument quickly loses the ability to resolve individual isotope peaks at higher charge states. This has the effect of "lumping" the isotopes together, producing a broadened peak.

Figure 3:
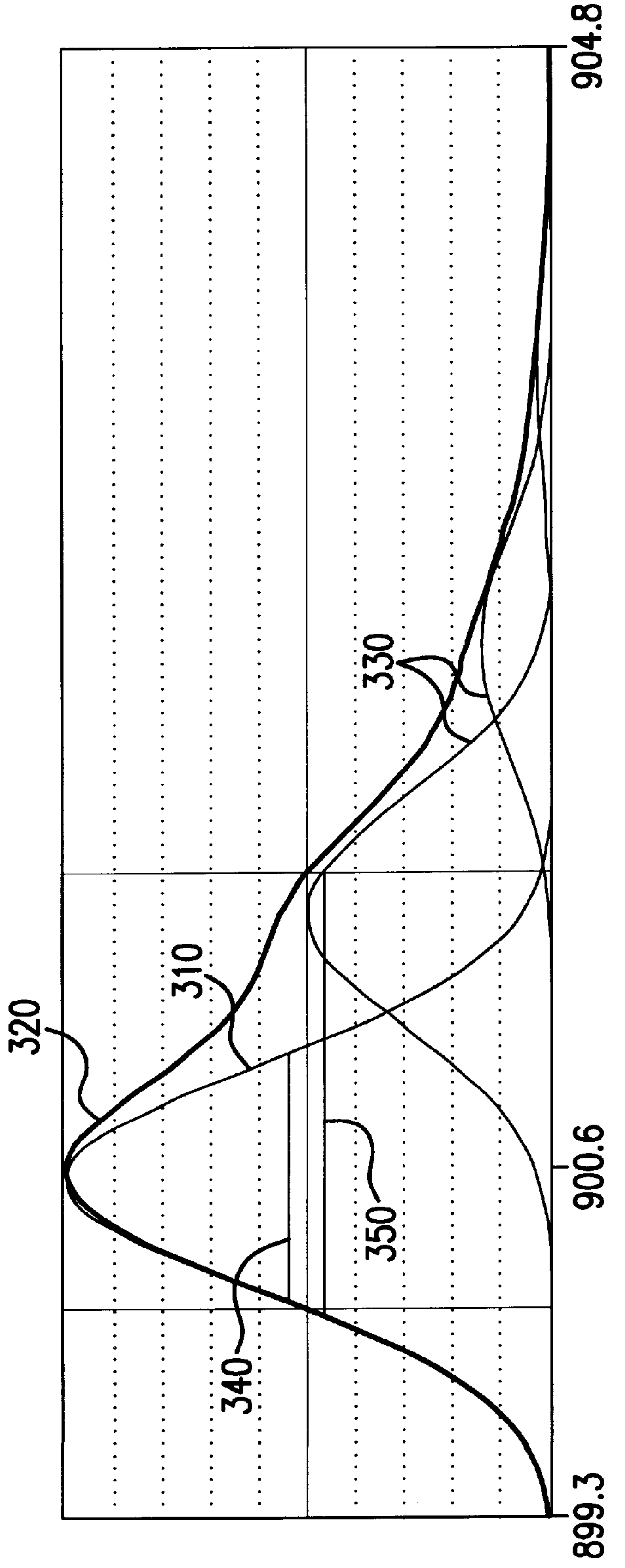
FIG. 3 shows the isotope pattern of a singly charged ion with low resolution.
Figure 4:
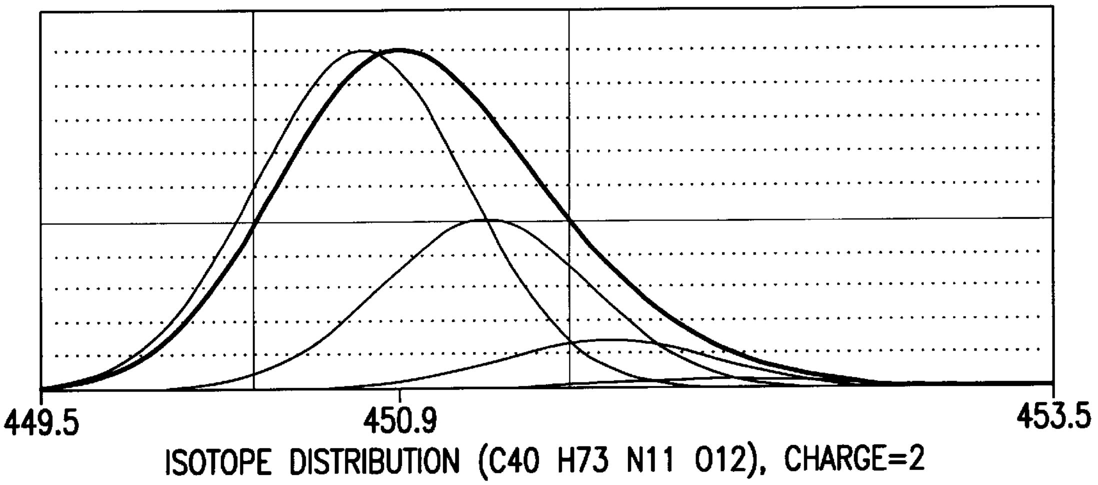
FIG. 4 shows the isotope pattern of a doubly charged ion with low resolution.
Figure 5:
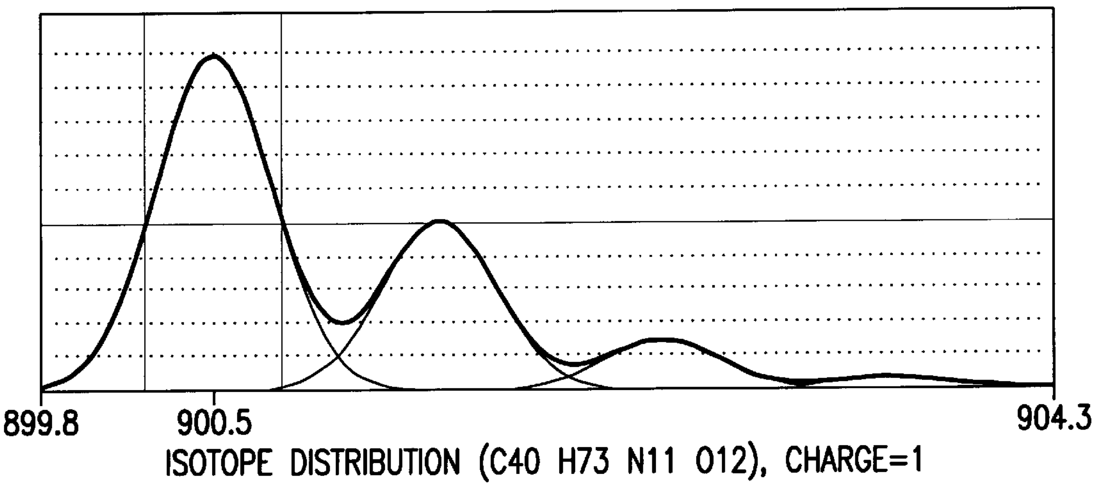
FIG. 5 shows the isotope profile of a singly charged ion with unit mass resolution.

The effects of resolution are shown in FIGS. 3 through 5. A device with high resolution is capable of resolving individual isotope peaks 310 and 330, where a device with lower resolution may only be capable of resolving the overall envelope 320. A measurement typically used in the art is peak width at half height (pwhh), some times just referred to as peak width. As implied by the name it is the width of an ion at an abundance value half the peak height. For isotope peak 310 of FIG. 3, 340 shows the peak width. For lower resolution peak 320, the peak width is shown as 350.

Figure 6:
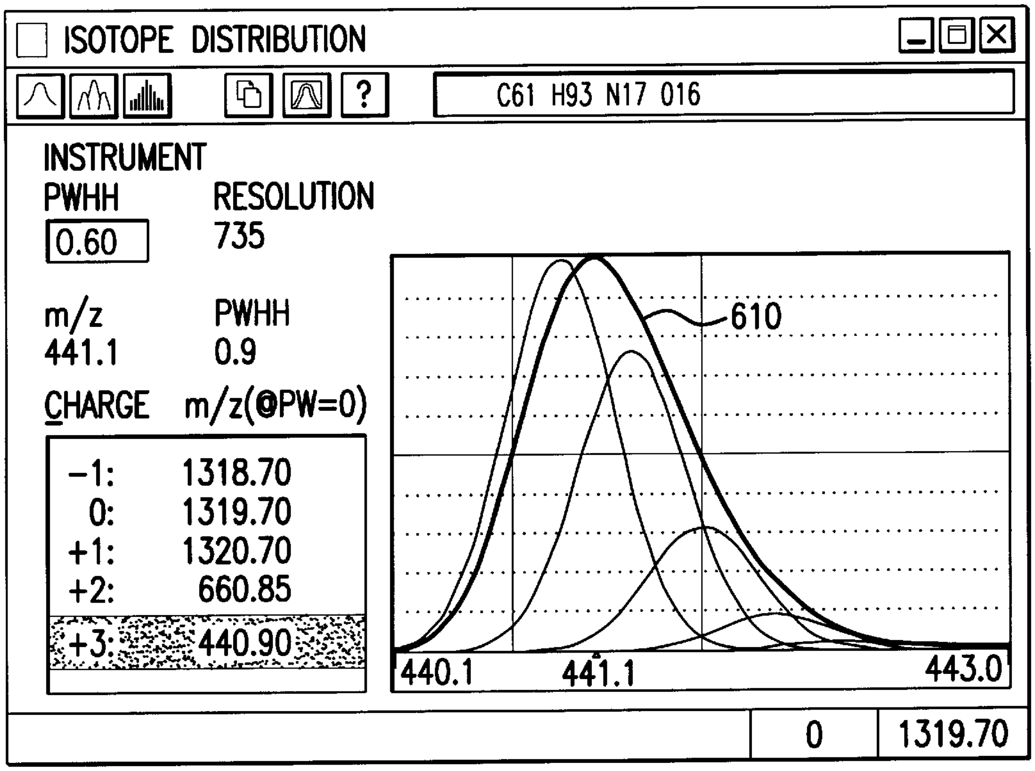
FIG. 6 shows the isotope cluster of a triply charged ion at m/z of 441 of a 1320 mass analyte.
Figure 7:
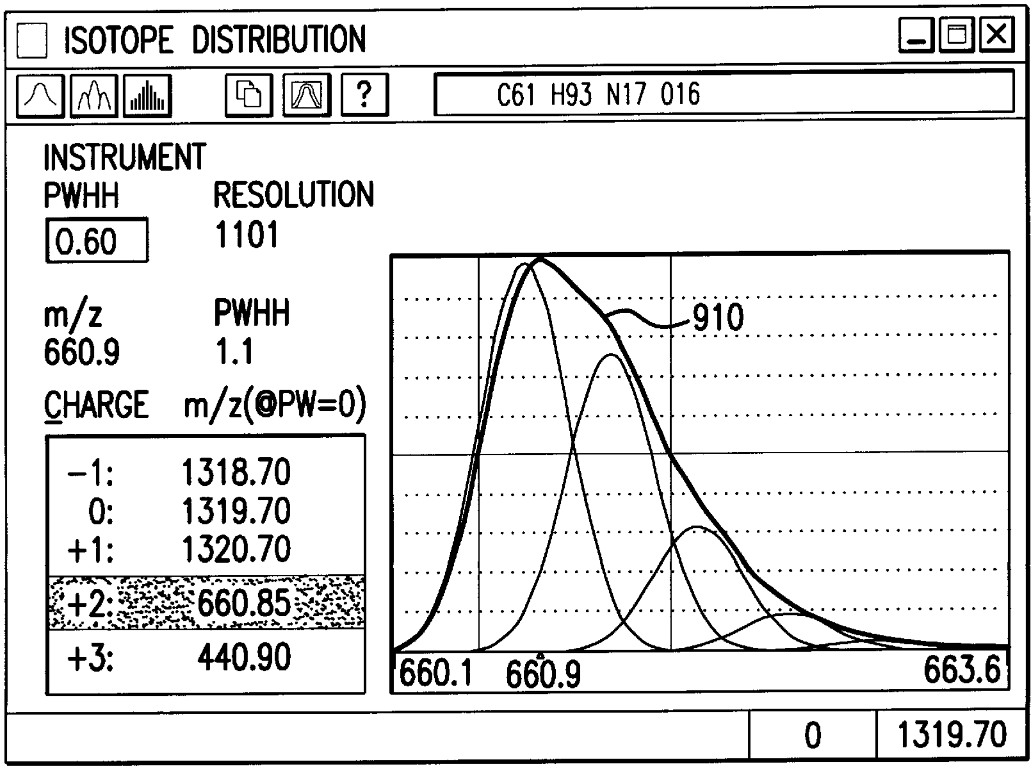
FIG. 7 shows the isotope cluster of a doubly charged ion at m/z of 661 of a 1320 mass analyte.
Figure 8:
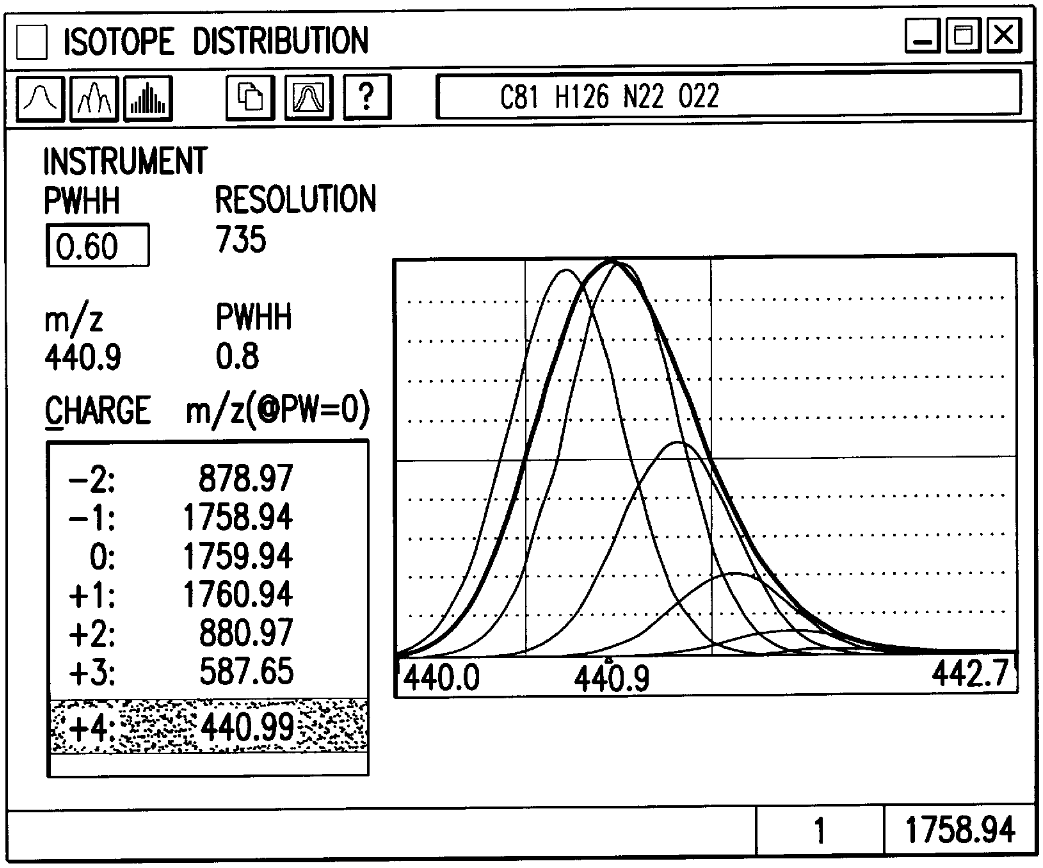
FIG. 8 shows the isotope cluster of a quadruply charged ion at m/z of 441 of a 1760 mass analyte.

The effects of resolution in resolving isotope spacing in multiple charge states are shown in FIGS. 6 through 8. The +3 charge state of ion in FIG. 6 is resolved into isotopes spaced ⅓ amu apart, with the lower resolution instrument only showing the broader envelope 610. The +2 charge state of the ion of FIG. 7 may show isotope spacing of ½ amu in a high resolution instrument, or may just show the overall envelope 710. FIG. 8 shows this same effect with an ion of charge state +4, the lower resolution instrument showing only the broader envelope rather than the individual isotope patterns space ¼ amu apart.

While examining isotope spacing is known to the art, this test alone is not sufficient to correctly assign charge state. In mixtures it is possible for ions of different components to mimic the isotopic spacing of a singly charged ion. Additional testing, such as the width test or ratio test will detect that these are not isotopes.

The first step in the data analysis as shown in FIGS. 9 through 12 is to extract peak information from the detector output as shown in FIG. 2 and assign that information to ions. Typically, the data is examined in increasing m/z sequence. Abundance or intensity values below some noise threshold are discarded. A sequence of data points above the noise threshold are grouped together to form an ion. The data stored with the ion in the preferred embodiment of the invention includes the beginning and ending m/z values for the ion, and an assigned m/z value for the ion. This may be the m/z value with the highest abundance in the ion, or may be a calculated value such as the centroid.

Extraction of ion sets proceeds based on the list of ions. In the preferred embodiment, each pass of the process begins with the most abundant ion not already belonging to an ion series. One pass will process the entire list of remaining ions before proceeding to the next pass. There are up to three passes done on the list of ions.

A pass is made to find all ion series with 1 or more charge states, where resolved isotopes are found for at least one of the charge states. Then a pass is made to find all ion series with at least 4 charge states. Isotopes are also found if they exist for all ions in each series. The final pass, if the user has specified a minimum of 3 peaks in a set, is to find all ion series with 3 charge states. Also find isotopes if they exist for all ions in each series. The remaining residual ions in the list remain available for further analysis.

Once this processing has been completed, for each ion series, the molecular weight of the uncharged molecule is calculated using the equation $M_i=(m_i-m_a)i$ for each charge state, where $m_i$=m/z value of ion with charge state i and $m_a$=m/z value of adduct ion. Also, the average molecular weight $M=1\Sigma M_i$ is calculated. Finally, for each ion series, a mass spectrum of the uncharged molecule is reconstructed by transforming each data point in the isotope cluster of the ion at each charge state from the m/z space to the m, or mass, space, and summing the abundance values for each mass value m. From these summed abundance values, the molecular weight of the uncharged peak is calculated using curve fitting or centroids.

If possible, ions with low charge states are assigned their charge states prior to deconvolution. In all passes, this is done by looking at the isotope spacing, then verifying that spacing is possible considering the resolution of the instrument and the proposed charge state. The ion width is examined to insure it is consistent with the instrument resolution. Finally, the ratio of adjacent isotopes is examined to insure it is consistent with the proposed mass and the likely elemental composition (the ratio of C, H, N, O, S for peptides, for example) of the analyte.

In all passes, isotopes are found as shown in FIG. 10 by first calculating the isotope spacing for the predicted charge state. Isotope spacing is the inverse of charge state; at a charge state of +1, isotopes are spaced 1 amu apart; at +2, ½ amu apart, at +3, ⅓ amu apart, and so on. If the instrument is capable of resolving ions at this charge level, a search is made for resolved isotopes, as shown in FIG. 11. The preferred embodiment searches for resolved isotopes if the instrument pwhh is less than or equal to 0.8 time the calculated isotope spacing. If the instrument is capable of resolving some isotope detail at the predicted charge state, a search is made for unresolved isotopes as shown in FIG. 12.

The preferred embodiment searches for unresolved isotopes if the instrument pwhh is less than or equal to twice the calculated isotope spacing.

In all passes, if a charge state is assigned to an ion, a search is made for corresponding ions at plus and minus one charge unit. This process is repeated until an ion series is exhausted. Each proposed ion in the series is tested for peak width, isotope ratios, and isotope spacing to insure it is consistent with the proposed series. Only if all the tested ions fit the series, passing the tests applied, are they considered to be part of a series. Once an ion is designated as part of a series, it is removed from the list of ions available for starting a new set.

Peak width testing, where the peak width is calculated at half the maximum height of the ion is extremely valuable. Peak width is used in two types of testing. First, for low charge states where isotopes may be resolved or partially resolved by the instrument, peak width is used to insure the isotope peak width is consistent with the ion peak width. For higher charge states where isotopes are not resolved by the instrument, the ion peak width decreases smoothly as the charge state goes from low to high. This peak width testing may be used to exclude ions that are not truly part of a series. For example, an analyte with a base molecular weight of 1320 would have a +3 charge ion appearing at a m/z value of 441, as shown in FIG. 6. Unfortunately, a +4 charge state of an ion with a base molecular weight of 1760 also has an m/z value of 441. This is shown in FIG. 8. Where the approach used by Fenn would erroneously incorporate this +4 charge state of the heavier analyte into the series, the difference in peak widths between the +3 and +4 charge state analytes, shown in FIGS. 6 and 8, clearly identifies and excludes the +4 charge state ion from being incorporated.

By only marking those ions that pass all the above tests, fewer charge assignment errors are made. Molecular weight can be assigned to samples having only one charge state. Monomer/dimer pairs can be distinguished from +1 and +2 pairs.

Dimers can be formed in the ionization process when high concentrations of the sample are present; two molecules of the analyte are non-covalently associated and acquire a proton. This dimer appears with an m/z of twice that of the monomer m/z. Without applying these tests, in approaches such as Fenn, the monomer is misassigned as a +2 charge state of the dimer, which is assigned a +1. This deconvolves to give an erroneous mass of twice that of the true mass of the monomer. The disclosed invention reports the monomer and the dimer as both singly charged, reporting them as separate sets.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. In a mass spectrograph with a given instrument resolution, a method of determining whether a given ion belongs to a particular charge series comprising the steps of:

predicting a charge state for the ion;

measuring the peak width of the ion;

calculating the expected peak width for the ion given the predicted charge state and instrument resolution; and comparing the measured peak width to the calculated peak width to determine whether an ion belongs to a particular charge series.

2. In a mass spectrograph with a given instrument resolution, a method of determining whether a given ion belongs to a charge series comprising applying one or more of the tests of:

comparing measured isotope spacing to the predicted isotope spacing for a predicted charge state, comparing the measured peak width of the ion against a calculated peak width to determine whether an ion belongs to a particular charge series, or comparing the ratios of the isotope peak heights.

3. The method of claim 2 where the calculated peak width is computed from instrument resolution and predicted charge state for the ion.

4. A method of calculating molecular weight of an analyte in a sample in a mass spectrograph with a given resolution comprising:

creating charged ions from the sample;

performing a mass analysis on the charged ions producing mass/charge (m/z)

values and abundance values for the charged ions;

forming a list of ions from the mass/charge values and abundance values;

selecting an ion from the list to start a charge series;

predicting a charge state for the ion;

testing the ion to see if it is valid for the predicted charge state;

if the ion is valid, searching for corresponding ions at plus and minus one charge units forming the charge series, until the ion series is exhausted; and deconvolving the ions in the charge series to arrive at a molecular weight of the analyte.

5. The method of claim 4 where the step of selecting an ion from the list to start a new charge series further includes the step of excluding from the selection process those ions that have already been assigned to a charge series.

6. The method of claim 4 where the step of testing the ion to see if it is valid for the predicted charge state further comprises:

measuring the peak width of the ion;

calculating the expected peak width for the ion given the predicted charge state and instrument resolution; and comparing the measured peak width to the calculated peak width.

7. The method of claim 4 where the number of ions in a series is less than 4.

8. The method of claim 4 where the number of charges z on an ion is less than 4.

* * * * *